Patented Feb. 3, 1942

2,272,155

UNITED STATES PATENT OFFICE 2,272,155

PREPARATION OF PHENOLIC CONDENSATION PRODUCTS

Reinhart Müller, Erkner, near Berlin, Germany, assignor, by mesne assignments, to Bakelite Corporation, a corporation of New Jersey No Drawing. Application December 16, 1938, Serial No. 246,123. In Germany December 21, 1937

1 Claim. (Cl. 260—57)

It is known that many of the oxides or hydroxides of the alkali and alkaline-earth metals are useful catalysts for the condensation of phenol with formaldehyde or its polymers. In general, the hydroxide of alkali metals as well as the oxides and hydroxides of calcium, barium, and strontium are used because they are relatively highly soluble and consequently the reaction takes place quite effectively; ordinarily, the metal phenolates are formed and in the final analysis they are the actual reactants in forming the condensation products. Magnesium hydroxide and particularly magnesium oxide, however, are rarely ever used, since these compounds dissolve with great difficulty and consequently complete reactions cannot be readily obtained; when magnesium hydroxide or oxide is used as a catalyst, a condensation product results which for the most part contains particles of unused catalyst, and moreover the condensation product formed has a decided tendency to scorch during dehydration.

It has now been found that magnesium phenolate because of its relatively good solubility in phenol is an exceptionally good catalyst for the condensation of phenol with formaldehyde and has none of the disadvantages which magnesium hydroxide and magnesium oxide display. By using magnesium phenolate as a catalyst for the condensation of phenol with formaldehyde or its polymers, larger yields of the condensation product are obtained in a relatively shorter reaction time and entirely without the difficulty heretofore invariably present during dehydration. The synthetic resin prepared while using magnesium phenolate as catalyst is relatively quick hardening and is adapted preferably for impregnating fibrous materials of all kinds and particularly desirable for the production of molding material, though useful for numerous other purposes for which a resole in general is desirable. In particular, the finished article containing this phenolic resole as an impregnating or binding material is characterized by its excellent electrical properties and high chemical resistance.

While it is known that metal phenolates, for example those of the alkali metals and the alkaline earth metals, calcium, strontium and barium, can be prepared in various ways by reacting phenol with aqueous solutions of the hydroxide of the particular metal or by heating phenol with the hydroxide, the oxide or the metal itself, these methods fail when magnesium phenolate is to be prepared, principally because metallic magnesium reacts so much more intensively than the alkaline earth and alkali metals; the oxides and hydroxides of potassium, sodium, calcium, strontium and barium are more reactive than magnesium oxide and magnesium hydroxide. Phenol can be treated with metallic magnesium so as to effect a very mild reaction only when water is present, whereupon a very weak mixture of magnesium phenolate is formed; likewise, only a little magnesium phenolate is formed when magnesium oxide or magnesium hydroxide is heated with phenol under ordinary conditions.

It has been further found that magnesium phenolate can be readily prepared under controlled conditions by reacting a phenolic body, such as phenol or cresol, with an aqueous solution of a magnesium salt in the presence of an oxide or hydroxide of potassium, sodium, ammonia, strontium, calcium or barium and preferably magnesium chloride in the presence of caustic soda solution. At first magnesium hydroxide is formed, and this hydroxide in its freshly prepared state readily yields a magnesium phenolate which is neutral or basic according to the proportions of the reaction ingredients used; simultaneously a neutral alkali (metal) salt or alkaline earth salt is obtained from the reaction of the alkali metal oxide or alkaline earth oxide or hydroxide also present with the acid radical of the magnesium salt used which remains in the mother liquor from which the phenolate is separated.

The above process for preparing magnesium phenolate can be expediently carried out by mixing a predetermined amount of the selected phenol with an aqueous solution of a suitable amount of a magnesium salt and adding to this mixture gradually and while stirring, an aqueous solution or suspension of an alkali (metal) or alkaline earth hydroxide or oxide or ammonium hydroxide. This reaction can be accelerated by heating. Alternatively, one can proceed by first mixing the selected phenol with an aqueous solution or suspension of an alkali (metal) or alkaline earth oxide or hydroxide or with ammonium hydroxide and thereafter adding an aqueous magnesium salt solution. The neutral magnesium phenolate formed is a white, crystalline, easily filtered substance which can be readily dissolved in an excess of phenol; the precipitation of the crude phenolate from the mother liquor is caused by dilution with a little water. When this reaction is carried out with the proportions of the above ingredients necessary for producing a basic magnesium phenolate, the latter is obtained in the form of a white substance which is difficultly soluble in water and in the usual solvents; it can be filtered off or centrifuged in the usual manner and freed from the mother liquor by washing with a little water.

This process for preparing magnesium phenolate has considerable commercial value, being a simple and reliable method of obtaining the product in a highly desirable condition, suitable for many uses, especially as a catalyst for condensation reactions.

There is, however, a decided advantage in conducting the process by preparing magnesium phenolate in correlation with the condensation of the selected phenol and formaldehyde or its polymers. This occurs by the use of such an excess of phenol that the magnesium phenolate formed is immediately dissolved in the excess phenol, and the simultaneously formed aqueous salt solution can be separated out from the magnesium phenolate-phenol solution; the latter is then used without further processing for the condensation reaction with formaldehyde or its polymers. This method of operation is particularly effective with phenols such as pure carbolic acid which in their condensation with formaldehyde form no clearly stratified layers such as a distinct resin layer and an aqueous layer. However, it is still possible, by using cresol and other phenols in the condensation of which layer separation does take place, to cause the desired mixture of magnesium salt solution and alkali (metal, especially alkaline-earth hydroxide or oxide or ammonium hydroxide to react and (apart from the separation of the salt solution before the beginning of the condensation reaction and the formation of the magnesium phenolate) to combine this reaction with the condensation reaction in such a way that phenol and formaldehyde are also reacted during the formation of the desired mixture of magnesium phenolate. Thus, in the preparation of magnesium phenolate freshly formed alkali (metal), ammonium, or alkaline earth salts remain, after the resin separation, in the aqueous layer and can be drawn off therewith at the end of the condensation reaction.

The first three of the following examples describe the preparation of the phenolate apart from the condensation reaction and the last two describe its preparation simultaneously with the condensation reaction.

*Example 1*

| | Parts by weight |
|---|---|
| Phenolic liquid | 26 |
| Crystalline magnesium chloride dissolved in twice its weight of water | 51 |
| 20 per cent solution of caustic soda | 100 |

The magnesium chloride solution is mixed with the phenol and after heating to about 20 to 30° C. the caustic soda solution is added slowly while stirring. Upon cooling, the crude phenolate is filtered off, washed with water and dried over phosphorus pentoxide. The yield of basic magnesium phenolate obtained is about 90 per cent.

*Example 2*

| | Parts by weight |
|---|---|
| Phenolic liquid | 26 |
| Crystalline magnesium chloride dissolved in twice its weight of water | 51 |
| Pulverized crystalline barium hydroxide suspended in 100 parts of water | 79 |

The magnesium chloride solution is added to the mixture of the phenolic liquid and the barium hydroxide suspension and heated to about 60° C. while stirring for an interval of 5 minutes. Upon cooling and filtering, the magnesium phenolate is subjected to further processing as above described. The yield of basic magnesium phenolate obtained is about 85 per cent.

*Example 3*

| | Parts by weight |
|---|---|
| Crystalline phenol | 188 |
| 40 per cent solution of caustic soda | 200 |
| Crystalline magnesium chloride dissolved in 110 parts by weight of water | 203 |

These ingredients are mixed together and stirred for about 10 minutes while heating at 50 to 60° C. Upon cooling, the magnesium phenolate liberated is filtered off and washed with a little water, and if necessary, dried over phosphorus pentoxide. The yield of neutral magnesium phenolate obtained is about 90 per cent.

The above as well as the following described reactions need not be carried out with phenol alone, but cresol, xylenol, etc., as well as mixed phenols can also be used.

*Example 4*

| | Parts by weight |
|---|---|
| Crystalline phenol | 95 |
| 40 per cent formaldehyde solution | 100 |
| Basic magnesium phenolate | 12 | are heated in a reflux condenser to about 95 to 100° C. After 30 minutes of reaction the formaldehyde is combined, and the very thinly liquid reaction product can be dehydrated in the usual manner under vacuum to yield a hard, solid resin at normal temperatures and hardening quickly at relatively low temperatures.

*Example 5*

To the mixture of 100 parts by weight of phenol and 14.25 parts by weight of a 33 per cent magnesium chloride solution there is added, gradually, and with constant stirring, 20 parts by weight of a 20 per cent caustic soda solution. After a few minutes of continuous stirring at about 20 to 25° C., the reaction is complete and the undesirable sodium chloride solution which, however, still contains traces of magnesium therein can be readily separated out from the phenol layer by salting out.

This phenol layer, which contains the magnesium phenolate formed in solution, has added thereto an equal weight of a 40 percent solution of formaldehyde and is heated to boiling under reflux conditions. After 30 minutes of reaction the formaldehyde is combined, and a condensation product capable of being diluted with water is obtained, which (product) can be freed from water and distilled to yield a hard solid resin at normal temperature of a quick-hardening type.

*Example 6*

1000 parts by weight of commercial mixture of cresols, 800 parts by weight of a 40 per cent solution of formaldehyde, 71.5 parts by weight of anhydrous magnesium chloride and 300 parts by weight of a 20 per cent solution of caustic soda are reacted by boiling in a reflux condenser for 10 minutes. After cooling the thinly liquid condensation product is separated from the superficial aqueous layer which contains the sodium chloride formed and as well traces of magnesium salts. The liquid condensation product can be dehydrated in the usual manner by distillation under vacuum. A yield of about 120 per cent (based on the cresol) of a solid, somewhat white resin which hardens very quickly at relatively low temperatures, is thereby obtained.

Resins prepared with magnesium phenolates in accordance with this invention are particularly suited for mixing with fibrous materials in making molding compositions. Resins commonly used for this purpose are the two-step resins consisting of a novolak resin and hexamethylenetetramine as a hardening agent; such resins give fast molding compositions with good mechanical strength and appearance in the molded articles, but the molded articles so made are not satisfactory when low electric losses are required and they retain released ammonia to a degree that is frequently objectionable. Likewise phenolic resins catalyzed with caustic soda or sodium phenolate are not suited for molding compositions intended for electrical uses because of the poor insulating qualities of the articles molded therefrom. These experiences of the past with phenolic resins justify the expectation of similar results with resins made in the presence of magnesium phenolates; it is therefore most surprising that to the contrary such catalyzed resins exhibit the characteristic molding speed and properties in the molded articles of the two-step resins and in addition give finished articles fulfilling from an electrical standpoint the requirements of the "type S" products (published in "Plastische Massen" 1937, page 339 a. f.) and further are free from ammonia or alkali salts.

The preparation of molding materials from resins of this invention follow the customary practice of premixing the resin with the fibrous filler and passing between heated rolls to fuse the resin and secure a uniform impregnation of the filler. The rolling is continued until the composition has the required degree of advancement for quick molding without exudation from the molds.

What is claimed is:

Process of preparing a condensation product of a phenol with formaldehyde characterized by heat reactivity in the absence of ammonia and alkali salts which comprises preparing a magnesium phenolate in the presence of excess of the phenol by adding to the phenol an aqueous solution of a magnesium salt and a member of the group consisting of the oxides and hydroxides of the alkali and alkaline earth metals and ammonium hydroxide, separating the magnesium phenolate solution in the phenol from the aqueous salt solution, adding thereto aqueous formaldehyde, and causing the phenol to condense with the formaldehyde.

REINHART MÜLLER.